E. ERB.
HOUSEHOLD ARTICLE.
APPLICATION FILED JUNE 4, 1920.
1,353,386.
Patented Sept. 21, 1920.
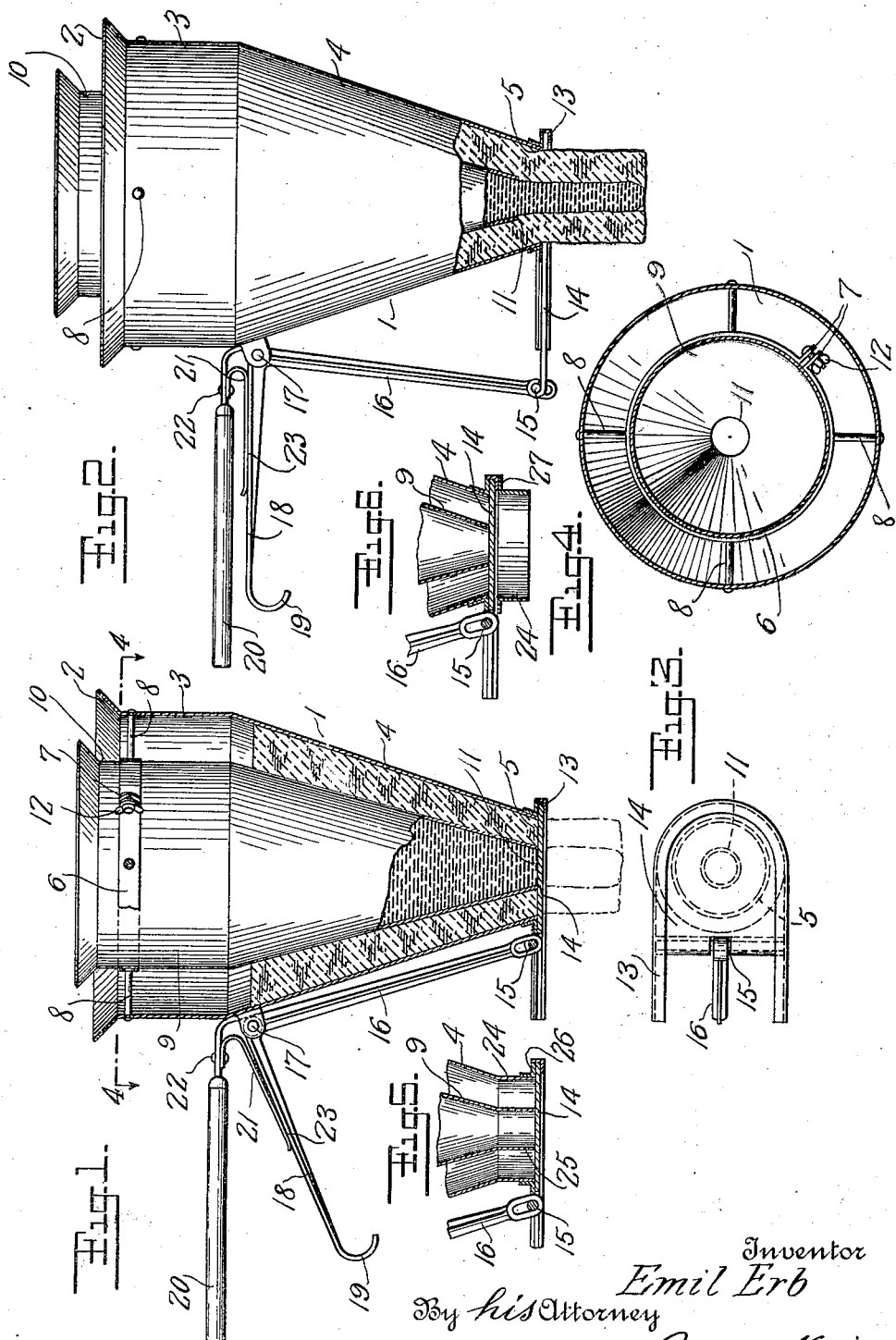
Inventor
Emil Erb
By his Attorney
Paul M. Klein

UNITED STATES PATENT OFFICE.

EMIL ERB, OF NEW YORK, N. Y.

HOUSEHOLD ARTICLE.

1,353,386.  Specification of Letters Patent.  Patented Sept. 21, 1920.

Application filed June 4, 1920. Serial No. 386,502.

*To all whom it may concern:*

Be it known that I, EMIL ERB, a subject of Switzerland, and resident of New York, in the county of New York and State of New York, have invented certain new and useful Improvements in Household Articles, of which the following is a specification.

This invention relates generally to improvements in household articles and particularly to dough-fillers.

The object of this invention is to provide a simple, inexpensive and effective dough-filler in which the relative quantities of the dough or other substance and the filling discharged therefrom may be regulated at will.

Other objects of this invention are to provide in such a dough filler means for effecting such regulation and means for keeping the outlets of said dough-filler normally closed and for opening same when desired.

Heretofore, in dough-fillers or similar devices, no substantial provision had been made for regulating the relative quantities of the dough substance and the filling. It very frequently becomes necessary to make such regulation on account of the fact that the viscosity of the filling varies with its composition, the less viscous the filling, the greater its rate of flow. It is also desirous at times to vary the quantity of the filling to be mixed with the dough.

In my improved dough-filler I have provided means for such regulation. I have also provided means for keeping the outlets of said dough filler normally closed and means for opening same when desired.

The foregoing and other objects will be more clearly understood from the following description together with the accompanying drawings in which:

Figure 1 is a partial cross-sectional vertical view of my invention with cut-off valve or shutter in closed position.

Fig. 2 is a side elevation of my invention showing a cross-sectional view of the lower portion and a particular adjustment of the inner funnel, with the cut-off valve or shutter in open position.

Fig. 3 is a bottom view of same.

Fig. 4 is a cross-sectional view of same taken on line 4—4 (Fig. 1).

Figs. 5 and 6 are views showing modifications of my invention.

In the drawings there is disclosed an outer receptacle or funnel 1 flared at its inlet end 2 and having a cylindrically shaped upper portion 3, the lower cone shaped portion 4 terminating in a reduced outlet 5.

An annular clamp or band 6 having lipped ends 7 is attached at the upper portion 3 of outer receptacle or vessel 1 by means of rivets 8. An adjustable inner receptacle or vessel 9, similar in shape to outer receptacle 1 but somewhat higher as shown at 10 (Fig. 1) and having a reduced outlet 11, is engaged by clamp 6. A clamp or wing screw 12 passes through lipped ends 7 and when tightened secures inner receptacle 9 after the same has been adjusted to the desired vertical position. The receptacles 1 and 9 may be made from any suitable material and may have any desired capacity and shape. It will be noted that their outlets are parts of their conical portion in order not to obstruct the flow of their respective contents.

The inner receptacle or vessel 9 may be easily and entirely removed so that both receptacles may be thoroughly cleaned or used separately when desired. In the channeled horse-shoe shaped strip 13 secured at outlet end 5 of outer receptacle 1 is slidably mounted a cut-off valve or shutter 14. The shutter 14 is loosely connected at 15 to lever arm 16 of a spring operated shutter lever fulcrumed in bracket 17, the lever arm 18 of said shutter lever being hook shaped at 19 to be readily engaged by the operator's finger.

A handle 20 is secured at its farther end to bracket 17. A spring 21, one end of which is secured to handle 20 at 22 the other end to lever arm 18 at 23 is disposed to act upon the shutter lever so as to keep shutter 14 normally closed.

Fig. 5 discloses a modified form of my invention in which outer and inner funnels or vessels 1 and 9 respectively terminate in collars or nozzles 24 and 25 and the slide valve 14 being mounted on the outer ends of said collar 24 as shown at 26.

Fig. 6 discloses another modified form in which slide valve 14 is mounted between the funnels 1 and 9 and collars 24 as shown at 27.

The operation of my device is as follows:

The inner funnel or receptacle 9 is vertically adjusted as desired. The dough or other substance is placed into funnel or receptacle 1, the filling into inner funnel or receptacle 9, while shutter 14 is normally closed. When the latter is opened, the dough forms a tube into which the filling enters, as shown in Fig. 2. By means of clamp 6 the inner funnel 9 may be adjusted to increase or decrease the quantity and rate of flow of the filling. The increase or decrease of flow of the filling material is caused by the adjustment of the inner receptacle. An increase of flow from the outer receptacle is caused by adjusting the inner receptacle upwardly due to the opening of these vessels being enlarged. The increase in the flow from the outer receptacle automatically decreases the flow of the filling material from the inner receptacle. The adjustment of the inner receptacle does not affect the size of the opening of the latter. The thus produced article may be baked or otherwise made fit for eating purposes. My device, as shown above may also be used for the filling operation of confections or any other purposes where two kinds of material are to be united in a similar way.

I claim—

1. In a dough-filler the combination of outer and inner generally funnel-shaped containers provided with cylindrical upper open portions and with end outlets, said inner container being higher than said outer one, a split resilient band having lipped ends, attached to said outer and engaging said inner container, a wing screw passing through said lipped ends adapted to tighten the band and thereby fix the vertical position of said inner container relative to said outer container, a shutter adapted to close both said outlets, a spring operated shutter lever for keeping the shutter in normally closed position, and a handle secured at the upper end of said outer container, for holding said dough-filler and for facilitating the operation of said shutter lever.

2. A dough-filler comprising an outer funnel, an adjustable inner funnel, an annular strip having lip formed ends and secured to said outer funnel, a wing screw engaging said lips adapted to hold said inner funnel in fixed position when vertically adjusted, a cut-off valve movably adapted to close or open the outlet ends of said inner and outer funnels, a spring operated cut-off valve lever secured at one end to said valve adapted to keep said outlet ends normally closed, a handle secured at the upper end of said outer funnel adapted for holding said dough-filler and for facilitating the operation of said valve.

3. In a dough-filler or similar device the combination of a generally cone shaped outer receptacle and a similarly shaped but higher inner adjustable receptacle having outlets, an annular clamping strip having lipped ends attached at the inner surface of the upper portion of said outer receptacle, means adapted to engage said lipped ends thus facilitating said inner vessel being held in fixed position when vertically adjusted, a cut-off valve adapted to normally close said outlets, and means for operating said cut-off valve.

4. As a new article of manufacture a dough-filler or similar device comprising an outer funnel and an adjustable inner funnel having outlet ends, said inner funnel being higher than the outer, clamping means for facilitating the vertical adjustment of said inner funnel within the outer funnel, a shutter connected to said outer funnel at its outlet end, lever means connected to said shutter and means for keeping said shutter normally closed.

5. In a new article of manufacture a dough-filler or similar device comprising an outer and an inner vessel having outlet ends, clamping means attached to said outer vessel facilitating the said inner vessel being raised or lowered relative to said outer vessel when desired, thereby regulating the relative flow of substances contained in said inner and outer vessels and means for closing or opening said outlet ends.

6. In a dough-filler or similar device comprising an outer receptacle and an adjustable inner receptacle having outlet ends, means for vertically adjusting said inner receptacle relative to said outer receptacle and means for opening and closing said outlet ends when desired.

Signed at New York, in the county of New York, and State of New York, this 29th day of May, A. D. 1920.

EMIL ERR